(12) United States Patent
Zhang et al.

(10) Patent No.: US 7,964,025 B2
(45) Date of Patent: Jun. 21, 2011

(54) RECLAIMING CARBON DIOXIDE FROM BOILER FLUE GAS

(75) Inventors: Fengshan Zhang, Panjin (CN); Yuanwen Gao, Panjin (CN)

(73) Assignee: Liaohe Petroleum Exploration Bureau, CNPC, Panjin (CN)

( * ) Notice: Subject to any disclaimer, the term of this patent is extended or adjusted under 35 U.S.C. 154(b) by 627 days.

(21) Appl. No.: 11/940,262

(22) Filed: Nov. 14, 2007

(65) Prior Publication Data
US 2008/0236398 A1 Oct. 2, 2008

(30) Foreign Application Priority Data
Mar. 30, 2007 (CN) .................... 2007 2 0011442 U

(51) Int. Cl.
*B01D 53/14* (2006.01)
(52) U.S. Cl. ............... 95/181; 62/606; 95/183; 95/199; 95/235; 95/236; 96/234
(58) Field of Classification Search .............. 96/235, 96/234; 95/95, 181, 183, 235, 236, 199, 95/228; 62/606
See application file for complete search history.

(56) References Cited

U.S. PATENT DOCUMENTS

| | | | |
|---|---|---|---|
| 4,144,038 A * | 3/1979 | Armond | 95/95 |
| 6,274,108 B1 * | 8/2001 | Fujii et al. | 423/228 |
| 2001/0015061 A1 * | 8/2001 | Viteri et al. | 60/39.161 |
| 2003/0059352 A1 * | 3/2003 | Karras et al. | 422/170 |
| 2008/0236114 A1 | 10/2008 | Zhang | |

* cited by examiner

*Primary Examiner* — Duane Smith
*Assistant Examiner* — Tiffany N Palmer
(74) *Attorney, Agent, or Firm* — Mintz, Levin, Cohn, Ferris, Glovsky and Popeo, P.C.

(57) ABSTRACT

Systems and techniques for the reclamation of carbon dioxide from boiler flue gas as well as for the liquefaction of the reclaimed carbon dioxide for well injection oil recovery are provided. A system can include a boiler, tower scrubber, carbon dioxide absorber, regenerator, reboiler, rectifying tower, condenser and mixing tank. Mixed gases of carbon dioxide and nitrogen for well injection may be reclaimed from boiler flue gas when steam is produced resulting in an increase of crude oil output increase while lessening environmental impact. Related systems, apparatus, methods, and articles are also described.

14 Claims, 1 Drawing Sheet

RECLAIMING CARBON DIOXIDE FROM BOILER FLUE GAS

CROSS REFERENCE

Figure 1:
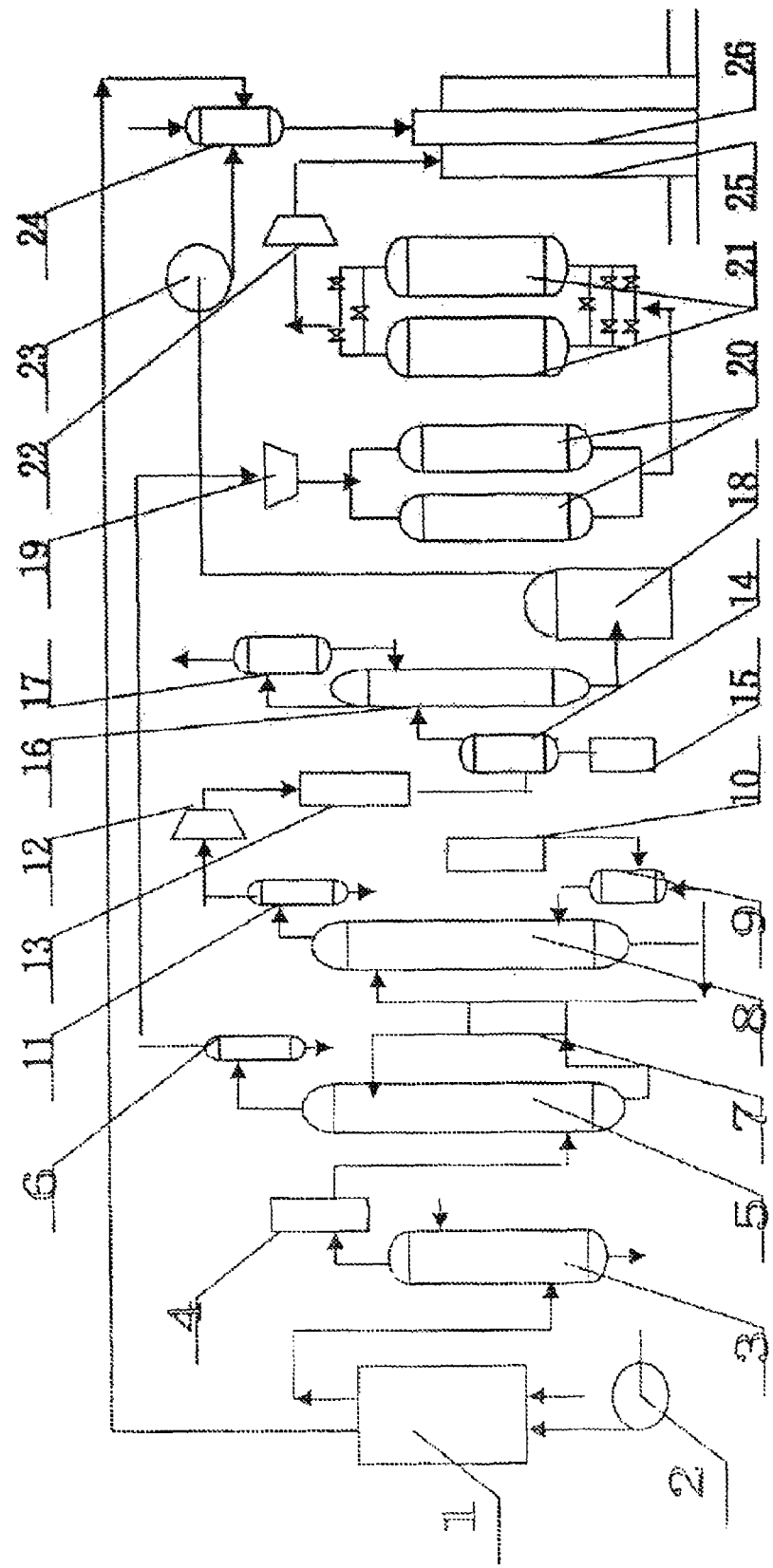

The present patent application claims priority under 35 U.S.C. §119 to Chinese Patent Application Serial No. 200720011442.1 filed on Mar. 30, 2007, and entitled, "Equipment for Reclaim of Carbon Dioxide from Boiler Flue Gas" the entire disclosure of which is incorporated by reference herein.

FIELD

The subject matter described herein relates to comprehensive and mate equipment for thick crude oil (or called "dense" crude oil) recovery, especially one for the separation and purification of carbon dioxide from boiler flue gas as well as for the liquefaction and injection of the reclaimed carbon dioxide in oil recovery.

BACKGROUND

In oil fields, the reservoir bed belonging to the continental facies bears considerable heterogeneity during the process of sedimentation. Part of the crude oil containing water has fast rising velocity for its high viscosity. In addition, the exploitation of many oil fields has entered into the middle or later period: though a series of measures such as water or steam injection have been taken, the recovery efficiency of crude oil is still low, the exploitation cost is high, and a lot of original oil in-place is difficult to or even cannot be exploited economically. Worse still, the recovery efficiency is even lower while the cost is even higher with regard to low permeable oil, thick crude oil as well as crude oil of condensate gas reservoirs. In current technologies, gases for tests of oil recovery by gas injection mainly include steam, carbon dioxide and nitrogen.

With conventional technique, natural gas injection into the oil field is one of the commonly used methods for oil recovery. Fairly favorable results can be obtained for the following reason: natural gas possesses some properties of crude oil in oil reservoirs and would not cause any harm to the oil bed; consequently, miscibility can be obtained under relatively low pressures or in the process of flooding. However, the technology is, to a certain extent, restricted by economic factors for the rising price of gas hydrate (including natural gas), which, as a result, motivates the studies on the injection of other gases, especially carbon dioxide and nitrogen.

It can be an effective approach to improve the exploiting effect of oil fields and increase oil recovery efficiency to flood carbon dioxide and/or nitrogen into the oil fields on the basis of traditional steam injection. Having high solubility in both water and oil, carbon dioxide, when solved into crude oil in huge amount, can expand the volume as well as decrease the viscosity of the crude oil. During the process of miscible flooding, carbon dioxide extracts and gasifies the light components contained in the crude oil, and in this way the interfacial tension is reduced and flooding is carried out. Meanwhile, carbon dioxide bears the excellent functions of improving mobility ratio, extracting and gasifying light hydrocarbons in crude oil as well as increasing, by molecular diffusion, the permeability of oil reservoirs, etc.

Flue gas of combustors such as boilers etc. consists of carbon dioxide and nitrogen, two key and economical gases for oil recovery by gas injection. With coal, gas or oil as the fuel, combustors including boilers used in oil fields usually produce flue gas containing 9%~15% carbon dioxide (by volume), 0%~85% nitrogen (by volume) and slight quantity of oxygen, sulfur dioxide and water.

Reclamation from flue gas of coal, gas or oil boilers may protect the environment and realize environment-friendly production. As the dominating component of greenhouse gases, carbon dioxide exerts non-negligible negative influence on the global ecological system, on the economic development as well as on the health and life quality of human beings. A critical point for minimizing the greenhouse effect is to restrict the content of carbon dioxide in the atmosphere. Therefore, reclamation has tremendous significance, considered from the viewpoint of tackling the greenhouse effect problem. Therefore, it is of great significance to reclaim carbon dioxide from flue gas of combustor so as to apply it in gas injection oil producing technology, which may not only increase the crude oil output but also reduce pollution to the environment.

Nitrogen has low solubility in water and the similar viscosity as methane for its larger compressibility and formation volume factor than other gases. As an inert gas, it has no toxicity or corrosivity or flammability; mixture of nitrogen with most of fluids always presents in the phase of cystose, which may have certain lifting influence on the fluids. The above properties enables nitrogen to improve the recovery efficiency of oil by various flooding modes such as immiscible flooding, miscible flooding, gravity flooding, combination flooding and water-gas alternating flooding, etc.

Thermal recovery has dominated the exploitation mode of some thick crude oil blocks in some oil fields. Take wet steam generator (23 ton thermal recovery boiler) for example: with natural gas as the fuel, each boiler discharges approximately 480 million $Nm^3$ of flue gas per year, which, if used as the proximal gas resource of carbon dioxide and nitrogen, may drastically lower the oil recovery cost and provide optimal resources for oil recovery by flue gas injection.

Gas injection into the oil well is an important technology for improving the oil recovery efficiency by reducing interfacial tension, lowering the viscosity of crude oil and restoring or maintaining the reservoir pressure when gases and crude oil form into immiscible or miscible phase for different gases and under different reservoir conditions.

The primary components of flue gas of steam-injection boilers, in the process of thermal recovery of thick crude oil by steam injection, are carbon dioxide and nitrogen. As is presented by studies, combination of steam boilers and mate flue gas reclaim equipment may realize the selective injection of steam, carbon dioxide, nitrogen or their mixture, which not only acquires satisfactory results of outcome increase but also is conducive to the environment protection.

Unfortunately, for various reasons, in the prior art, oil recovery by $CO_2$ or $N_2$ is in the pre-feasibility study period as a single technology and mature technology or equipment has not been developed yet.

SUMMARY

The current subject matter provides equipment for the reclamation and liquefaction of carbon dioxide from boiler flue gas as well as for injection of carbon dioxide into oil wells coupled with steam for thick crude oil recovery.

In a first aspect, equipment for the reclamation of carbon dioxide from boiler flue gas as well as for the liquefaction of the reclaimed carbon dioxide for well injection oil recovery. The equipment can comprise one or more of a boiler for generating high pressure steam, a tower scrubber, a carbon dioxide absorber, a heat exchanger, a regenerator, a reboiler, a steam boiler, a liquefier, a congealer, a rectifying tower, a condenser, a storage tank and a mixing tank.

The flue gas outlet at the top of the boiler can connect with the tower scrubber by pipelines. The steam outlet at the top of the boiler can connect with the mixing tank. The tower scrubber can connect with the carbon dioxide absorber by pipelines. The carbon dioxide absorber can connect with the heat exchanger by pipelines. The heat exchanger can connect with the regenerator by pipelines. The steam boiler can connect with the reboiler by pipelines. The reboiler can connect with the regenerator. The regenerator can connect with the liquefier by pipelines. The liquefier can connect respectively with the congealer and the rectifying tower. The rectifying tower can connect respectively with the condenser and the storage tank by pipelines. The storage tank can connect with the mixing tank by pipelines. The mixing tank can connect with the gas injection tube of the oil well.

In a further aspect, equipment for the reclamation from boiler flue gas as well as for the liquefaction of the reclaimed carbon dioxide for well injection oil recovery is provided. The equipment can comprise of one or more of a boiler for generating high pressure steam, a high pressure water pump, a tower scrubber, a carbon dioxide absorber, a heat exchanger, a regenerator, a reboiler, a steam boiler, a liquefier, a congealer, a rectifying tower, a condenser, a storage tank and a mixing tank.

The boiler can connect with the high pressure water pump by pipelines. The flue gas outlet at the top of the boiler can connect with the tower scrubber by pipelines. The steam outlet at the top of the boiler can connect with the mixing tank. The tower scrubber can connect with the carbon dioxide absorber by pipelines interposing with an induced draft fan. The carbon dioxide absorber can connect with the heat exchanger by pipelines. The heat exchanger can connect with the regenerator by pipelines. The steam boiler can connect with the reboiler by pipelines. The reboiler can connect with the regenerator. The regenerator can connect with the liquefier by pipelines. The liquefier can connect respectively with the congealer and the rectifying tower. The rectifying tower can connect respectively with the condenser and the storage tank by pipelines. The storage tank can connect with the mixing tank by pipelines. The mixing tank can connect with a gas injection tube of the oil well.

Between the regenerator and the liquefier, a water segregator and a purifier can be provided. The regenerator can connect with the water segregator by pipelines. The water segregator can connect with the purifier by pipelines interposing with a carbon dioxide compressor. The purifier can connect with the liquefier by pipelines, and a carbon dioxide pump can be provided between the storage tank and the mixing tank.

The carbon dioxide absorber can connect with a nitrogen separation tank by pipelines. The nitrogen separation tank can connect with a nitrogen compressor by pipelines. The nitrogen compressor can connect with drying beds by pipelines; the drying beds connect with adsorption beds by pipelines. The adsorption beds can be connected by pipelines with a well casing interposing with a nitrogen pressurizer.

In the aforesaid equipment for the reclamation from boiler flue gas as well as for the liquefaction of the reclaimed carbon dioxide for well injection oil recovery, the adsorption liquid adopted in absorber may be a mixed liquid of one or more solvents selected from the group consisting of polyethylene glycol dimethyl ether, trimethylether, tetramethylene sulfone, propylene carbonate and low temperature methanol or may be a mixed liquid of one or more solvents selected from the group consisting of monoethanolamine, methyldiethanolamine, oxidation inhibitor and corrosion inhibitor.

When the boiler is running, the produced steam may be directly injected into the well; and the flue gas, after scrubbed by the tower scrubber; absorbed by the absorber and regenerated by the regenerator, may produce a 98% (purity) carbon dioxide gas, which, after compressed by the carbon dioxide compressor, liquefied by the liquefier and rectified by the rectifying tower, may be stored in the storage tank and then injected into the oil well after pumped. The end gas, after being compressed, dried and absorbed, may produce a 96% (purity) nitrogen, which may be injected into the oil well after pumped. The steam, carbon dioxide liquid and nitrogen obtained from the boiler may be matched and injected into the well, thereby achieving the object of increasing the crude oil output and protecting the environment.

The current subject matter provides many advantages. For example, the current equipment, when producing steam by the boiler, can obtain carbon dioxide liquid and nitrogen for injection into the well, thus gaining favorable results of crude oil output increase as well as environment protection.

The details of one or more variations of the subject matter described herein are set forth in the accompanying drawing and the description below. Other features and advantages of the subject matter described herein will be apparent from the description and drawings, and from the claims.

DESCRIPTION OF THE ACCOMPANYING FIGURE

FIG. 1 is a structural diagram of overall process flow of the subject matter described herein.

DETAILED DESCRIPTION

Given by the following implementary example, the subject matter described herein is specified with reference to the appended figure.

As is illustrated in FIG. 1, the equipment provided by the subject matter described herein for the reclamation from boiler flue gas as well as for the liquefaction of the reclaimed carbon dioxide for well injection oil recovery can comprise a boiler 1, a high pressure water pump 2, a tower scrubber 3, an induced draft fan 4, an absorber 5, a separation tank 6, a heat exchanger 7, a regenerator 8, a reboiler 9, a steam boiler 10, a water segregator 11, a carbon dioxide compressor 12, a purifier 13, a liquefier 14, a congealer 15, a rectifying tower 16, a condenser 17, a storage tank 18, a nitrogen compressor 19, a drying beds 20, an adsorption beds 21, a nitrogen pressurizer 22, a carbon dioxide pump 23 and a mixing tank 24.

The structure, assembly and installment of the equipment for the reclamation from boiler flue gas as well as for the liquefaction of the reclaimed carbon dioxide for well injection oil recovery can be as described below.

The boiler 1 can connect with the high pressure water pump 2 by pipelines. The steam outlet at the top of the boiler 1 can connect with the mixing tank 24 by pipelines. The flue gas outlet at the top of the boiler 1 can connect with the tower scrubber 3. The tower scrubber 3 can connect with the absorber 5 by pipelines, and between them can be equipped the induced draft fan 4. The absorber 5 can connect respectively with the separation tank 6 and heat exchanger 7 by pipelines.

The boiler 1 is used for producing high pressure steam.

As to boiler 1, the inner tubes may be high pressure channels able to produce pressure of over 15 MPa; the fuel may be coal, crude oil or flammable gases; purified water for production is provided by the high pressure pump 2 with pressure of over 15 MPa.

The tower scrubber 3 is used for the removal of sulfur dioxides and dusts in the flue gas.

The tower scrubber 3 is a packing tower. The packing material may be made of metals, plastics or ceramics as well as of charcoal, minerals or vegetable silk. The eluant may be water, alkalescent solution such as natrium carbonicum solution or ammonia water etc. as well as sulfite solution.

The flue gas is washed in the tower scrubber 3 to remove the contained sulfur dioxide and solid particles and then enters into the absorber 5.

The absorber 5 and the regenerator 8 constitute the carbon dioxide reclaim system. The carbon dioxide adsorption liquid is introduced into the absorber 5 from the top down. The adsorption liquid is used for absorbing the carbon dioxide contained in the boiler flue gas. The regenerator 8 is used for regenerating the adsorption capability of the adsorption liquid. The current subject matter may use carbon dioxide adsorption liquid.

The absorber 5 and the regenerator 8 are both packing towers, in which the packing material may be made of metals, plastics or ceramics.

The adsorption liquid in the absorber 5 may be carbon dioxide absorbents, for example, those carbon dioxide absorbents containing a mixed liquid of one or more solvents selected from the group consisting of polyethylene glycol dimethyl ether, trimethylether, tetramethylene sulfone, propylene carbonate and low temperature methanol, or a mixed liquid of one or more solvents selected from the group consisting of monoethanolamine, methyldiethanolamine, oxidation inhibitor and corrosion inhibitor.

The induced draft fan 4 positioned between tower scrubber 3 and absorber 5 can be used for providing power for the flow of flue gas in the upper part of the equipment of the subject matter described herein. The induced draft fan 4 may be any type of blower suitable for the transmission of gases in pipelines.

The adsorption liquid flowing out from the inferior part of absorber 5 is rich in carbon dioxide and for this reason is called "rich liquid". The rich liquid is pumped into the heat exchanger 7 through pipelines.

The heat exchanger 7 can connect with the regenerator 8 by pipelines. The rich liquid, which is heated through heat exchange in the heat exchanger 7, is pumped through pipelines into the regenerator 8 from the top of it.

Inside the regenerator 8, the rich liquid flows through the packing layer from the top down and is heated by the steam entering into the regenerator 8 from the bottom up and in this way, the carbon dioxide in the rich liquid is released (the adsorption of carbon dioxide is removed) and emitted from the top of the regenerator 8.

The steam boiler 10 can connect with the reboiler 9 by pipelines. The reboiler 9 can connect with the regenerator 8 by pipelines.

The reboiler 9 can be a shell and tube heat exchanger. Solution coming from the bottom of the regenerator 8 in which the carbon dioxide has not been completely released enters into the tubes of the reboiler 9 into which steam from the steam boiler 10 is introduced. Therefore, the solution containing carbon dioxide can be heated in the reboiler 9 and the carbon dioxide therein is released out and leaves from the top of the boiler 9 into the regenerator 8 and then is emitted out into the separation tank 11 from the top of the regenerator 8.

On the other hand, high temperature solution basically free from carbon dioxide (also referred to as "lean liquid") leaves from the bottom of reboiler 9 and enters into the heat exchanger 7 through pipelines and exchanges heat with the said low temperature solution rich in carbon dioxide coming from the outlet at the inferior part of absorber 5 ("rich liquid"), and then enters into absorber 5 from its top and continues to be adsorption liquid for absorbing carbon dioxide in the flue gas.

The regenerator 8 can connect with the water segregator 11 by pipelines. The desorbed carbon dioxide gas enters into the water segregator 11 from the regenerator 8 through pipelines.

The water segregator 11 can be used for the separation and removal of the slight quantity of liquid water contained in the carbon dioxide gas coming from the regenerator 8.

The water segregator 11 can connect with the purifier 13 by pipelines. The Carbon dioxide compressor 12 is equipped between water segregator 11 and purifier 13. Gas coming from the water segregator 11 passes through the carbon dioxide compressor 12 and reaches the purifier 13, where the accompanied gaseous water is eliminated.

The purifier 13 can connect with the liquefier 14 by pipelines; the liquefier 14 can connect respectively with the congealer 15 and the rectifying tower 16 by pipelines.

The purifier 13, the liquefier 14, the congealer 15 and the rectifying tower 16 compose a carbon dioxide liquefying system, in which, the purifier 13 can be composed of two twin purifying beds packed with solid packing materials including aluminum oxide, silica gel, activated carbon or molecular sieve. The liquefier 14 can be a "U"-shape heat exchanger or a shell and tube heat exchanger and the refrigeration can be realized by low temperature liquid ammonia or freon supplied by the congealer. The rectifying tower 16 can be a packing tower the bottom of which is equipped with heating assembly and the top of which has refrigeration and condensation circumfluence system which contains the condenser 17.

Gas coming from the purifier 13 enters into the liquefier 14 through pipelines and here is cooled into liquid phase.

The gas, which has been turned into liquid in the liquefier, enters through pipelines into the rectifying tower 16, where it is slightly heated to remove the slight quantity of oxygen, nitrogen and other light gases (e.g. hydrogen and methane).

The rectifying tower 16 can connect respectively with the condenser 17 and the storage tank 18 by pipelines.

The removed slight quantity of oxygen, nitrogen and other light gases leaves from the top of the rectifying tower 16 and enters into the condenser 17 through pipelines and then is emitted from the outlet at the superior part of the condenser 17 out of the equipment system provided by the subject matter described herein.

The condenser 17 is used for the reclamation emitted out from the rectifying tower 16; the said carbon dioxide returns to the rectifying tower 16 through pipelines from the inferior part of the condenser 17.

With the equipment of the subject matter described herein, the content of carbon dioxide entering into the storage tank 18 from the inferior part of the rectifying tower 16 may reach as high as 99.9%. That is to say, liquid carbon dioxide with high purity may be gained successfully.

The storage tank 18 can connect with the mixing tank 24 by pipelines. Between them is equipped the carbon dioxide pump 23.

The liquid carbon dioxide of high purity can be sent to the carbon dioxide pump 23 through pipelines and after pressurization, sent to the mixing tank 24, where it can be mixed with pressurized nitrogen and/or pressurized steam and then injected into the oil well.

The flow of reclamation from boiler flue gas is described above. Described below is flow of reclamation of nitrogen from boiler flue gas.

Because of the absorbing effect of carbon dioxide absorber 5, the gas coming out from the top of the carbon dioxide absorber 5 basically contains no carbon dioxide. It is mostly nitrogen accompanied by slight quantity of oxygen and slimsy liquid and gas water. The gas coming out from the top of the carbon dioxide absorber 5 enters into the separation tank 6 through channels.

Separation tank 6 can be used for the removal of the liquid water contained in the gas coming out from the top of the carbon dioxide absorber 5. The liquid water can be discharged from the outlet at the bottom of the separation tank 6.

After the liquid water is removed, the gas coming out from the top of the separation tank 6 mainly contains huge amount of nitrogen, slight amount of oxygen and slimsy gas water.

The separation tank 6 can connect with the nitrogen compressor 19 by pipelines, the nitrogen compressor 19 can compress the gas free from liquid water and increases its pressure.

The drying beds 20 can be connected respectively with the nitrogen compressor 19 and the adsorption beds 21. The pressurized gas coming out from the compressor 19 enters into the drying beds 20 through pipelines. Filled with solid particle packing materials such as aluminum oxide, silica gel or molecular sieve, the drying beds 20 can be composed by connecting two drying-bed spigot groups of the same volume and pipelines. Water is further eliminated out of the gas in the drying beds 20.

Gas coming out from the drying beds 20 can enter through pipelines into the adsorption beds 21, where the slight amount of oxygen is removed.

The adsorption beds 21 can be composed of two adsorption beds of the same volume in which solid particle packing materials are filled such as aluminum oxide, silica gel or molecular sieve. The two adsorption beds can be connected with spigot groups and pipelines, and may be automatically operated by controlling spigots with PLC (Programmable Logical Controller).

Nitrogen of high purity is obtained after the oxygen is removed when the gas passes through the adsorption beds 21.

The adsorption beds 21 can be connected with the well casing 25 and between them a nitrogen pressurizer 22 can be provided. The high purity nitrogen coming from the adsorption beds 21 can be pressurized when passing through the nitrogen pressurizer 22 and then injected into the gas injection tube for oil recovery.

The mixing tank 24 can connect with the gas injection tube for oil recovery 26 by pipelines. With the mixing tank 24, the reclaimed carbon dioxide and nitrogen from flue gas and the high pressure steam produced from boiler 1 may be matched and mixed at various proportions for injection into the gas injection tube for oil recovery 26 for the exploitation of thick crude oil.

As is stated above, the current techniques and systems for the reclamation and liquefaction of carbon dioxide from boiler flue gas as well as for the injection of the carbon dioxide into the well for oil recovery is able to efficiently reclaim the carbon dioxide and nitrogen from the flue gas of steam boiler producing steam for well injection. The reclaimed carbon dioxide and nitrogen may be injected into the well for thick crude oil recovery coupled with the steam generated by the boiler. The current system and techniques fully utilize the exhaust gas produced by the steam boiler for thick crude oil recovery thereby greatly reducing the cost of thick crude oil recovery.

With the adoption of the current subject matter, carbon dioxide, nitrogen and high pressure steam may be injected together with various combinations and at different proportions. In this way, technologies for thick crude oil recovery are enriched, enabling oil recovery arts diverse enough for more practical conditions and considerably increasing the exploitation efficiency of thick crude oil wells.

It can also be seen that, the flue gas and the harmful substances contained in it are basically cleaned up after treatment by the subject matter described herein, and thus pollution to the environment is decreased.

For these reasons, adoption of the equipment and processes described herein may greatly lower the cost as well as increase the efficiency of thick crude oil well exploitation and at the same time reduce obviously the pollution to the environment.

In addition, carbon dioxide reclaimed from the boiler flue gas may be liquefied and stored in carbon dioxide cylinders. The stored carbon dioxide may be transferred to other places with transportation vehicles. So, carbon dioxide reclaimed from steam boilers at one oil well may be used in other wells.

Although a few variations have been described in detail above, other modifications are possible. For example, the process flow depicted in the accompanying figure and described herein do not require the particular order shown, or sequential order, to achieve desirable results. Moreover, different sub-components may be utilized in order to achieve desirable results. Other embodiments may be within the scope of the following claims.

What we claimed is:

1. An apparatus for reclamation of carbon dioxide from boiler flue gas as well as for the liquefaction of the reclaimed carbon dioxide for well injection oil recovery, comprising:
   a boiler for generating high pressure steam and flue gases from the combustion of a fuel source selected from the group consisting of coal, crude oil or flammable gases, the boiler having a flue gas outlet positioned at a top region of the boiler and configured to capture flue gases emitted from the boiler and a steam outlet positioned at the top region of the boiler and configured to capture steam emitted from the boiler;
   a tower scrubber coupled to the flue gas outlet of the boiler, the tower scrubber comprising packing material configured to remove sulfur dioxides and solid particles from the flue gases emitted from the flue gas outlet;
   a carbon dioxide reclaim system configured to purify from the flue gases carbon dioxide gas having at least about 98% purity, the reclaim system comprising:
      a carbon dioxide absorber coupled to the tower scrubber;
      a heat exchanger coupled to the carbon dioxide absorber; and
      a regenerator coupled to the heat exchanger and coupled to a reboiler,
   a steam boiler coupled to the reboiler;
   a carbon dioxide liquefying system configured to liquefy the carbon dioxide gas from the carbon dioxide reclaim system, the liquefying system comprising:
      a liquefier coupled to the regenerator;
      a congealer coupled to the liquefier; and
      a rectifying tower coupled to the liquefier and coupled to a condenser;
   a storage tank coupled to the rectifying tower and configured to store liquefied carbon dioxide supplied from the carbon dioxide liquefying system; and
   a mixing tank coupled to the storage tank and to the steam outlet of the boiler, the mixing tank operable to be coupled to a gas injection tube of an oil well, wherein the mixing tank is configured to mix pressurized steam from the boiler with the liquefied carbon dioxide gas from the storage tank into a proportion that increases recovery of thick crude oil from the oil well.

2. The apparatus of claim 1, wherein the boiler can be coupled to a high pressure water pump.

3. The apparatus of claim 1, wherein an induced draft fan is provided between the tower scrubber and the carbon dioxide absorber.

4. The apparatus of claim 1, further comprising:
a water segregator and a purifier provided between the regenerator and the liquefier; the regenerator is coupled to the water segregator, the water segregator being coupled to the purifier by piping interposing with a carbon dioxide compressor, the purifier being coupled to the liquefier; and
a carbon dioxide pump provided between the storage tank and the mixing tank.

5. The apparatus of claim 1, wherein the carbon dioxide absorber is coupled to a nitrogen separation tank.

6. The apparatus of claim 5, wherein the nitrogen separation tank is coupled to a nitrogen compressor, the nitrogen compressor being coupled to drying beds, the drying beds being coupled to adsorption beds, the adsorption beds coupled to a well casing by pipelines interposing with a nitrogen pressurizer.

7. The apparatus of claim 1, wherein the adsorption liquid adopted in the absorber is a mixed liquid of one or more solvents selected from a group comprising of polyethylene glycol dimethyl ether, trimethylether, tetramethylene sulfone, propylene carbonate and low temperature methanol, or is a mixed liquid of one or more solvents selected from the group consisting of monoethanolamine, methyldiethanolamine, oxidation inhibitor and corrosion inhibitor.

8. An apparatus for the reclamation of carbon dioxide from boiler flue gas as well as for the liquefaction of the reclaimed carbon dioxide for well injection oil recovery, comprising:
a boiler for generating high pressure steam having a gas flue outlet and a steam outlet;
a high pressure water pump coupled to the boiler;
a tower scrubber coupled to the flue gas outlet of the boiler;
a carbon dioxide reclaim system configured to purify flue gases from the boiler into carbon dioxide gas having at least about 98% purity, the reclaim system comprising:
a carbon dioxide absorber coupled to the tower scrubber;
an induced draft fan disposed between the carbon dioxide absorber and the tower scrubber;
a heat exchanger coupled to the carbon dioxide absorber; and
a regenerator coupled to the heat exchanger;
a reboiler coupled to the boiler and to the regenerator;
a steam boiler;
a carbon dioxide liquefying system configured to liquefy the carbon dioxide gas from the carbon dioxide reclaim system, the liquefying system comprising:
a liquefier coupled to the regenerator;
a congealer coupled to the liquefier;
a rectifying tower coupled to the liquefier and coupled to a condenser;
a storage tank coupled to the rectifying tower and configured to store liquefied carbon dioxide supplied from the carbon dioxide liquefying system;
a mixing tank coupled to the storage tank and the steam outlet of the boiler, the mixing tank operable to be connected with a gas injection tube of an oil well, wherein the mixing tank is configured to mix pressurized steam from the boiler with the liquefied carbon dioxide gas from the storage tank into a proportion that increases recovery of thick crude oil from the oil well;
a water segregator disposed between the regenerator and the liquefier;
a purifier disposed between the regenerator and the liquefier;
a carbon dioxide compressor disposed between the water segregator and the purifier;
a carbon dioxide pump disposed between the storage tank and the mixing tank;
a nitrogen separation tank coupled to the carbon dioxide absorber;
a nitrogen compressor coupled to the nitrogen separation tank;
drying beds coupled to the nitrogen compressor;
adsorption beds coupled to the drying beds; and
a nitrogen pressurizer disposed between the adsorption beds and a well casing.

9. The apparatus of claim 8, wherein the adsorption liquid adopted in absorber is a mixed liquid of one or more solvents selected from a group comprising: polyethylene glycol dimethyl ether, trimethylether, tetramethylene sulfone, propylene carbonate and low temperature methanol or is a mixed liquid of one or more solvents selected from the group consisting of monoethanolamine, methyldiethanolamine, oxidation inhibitor and corrosion inhibitor.

10. A method for recovery of thick crude oil from an oil well, comprising:
generating high pressure steam and flue gases in a boiler from the combustion of a fuel source;
capturing steam emitted from the combustion of the fuel source in a steam outlet in the boiler;
capturing flue gases emitted from the combustion of the fuel source in a flue gas outlet in the boiler;
removing sulfur dioxides and solid particles from the flue gases in a tower scrubber coupled to the flue gas outlet of the boiler;
purifying carbon dioxide gas from the flue gases to at least about 98% purity using a carbon dioxide reclaim system comprising a carbon dioxide absorber coupled to the tower scrubber; a heat exchanger coupled to the carbon dioxide absorber; and a regenerator coupled to the heat exchanger and to a reboiler;
liquefying the purified carbon dioxide gas from the carbon dioxide reclaim system using a carbon dioxide liquefying system comprising a liquefier coupled to the regenerator; a congealer coupled to the liquefier; and a rectifying tower coupled to the liquefier and to a condenser;
mixing in a mixing tank the steam from the steam outlet of the boiler with the liquefied carbon dioxide gas from the liquefying system into a proportion adapted for recovering an amount of thick crude oil from an oil well; and
injecting the proportion into a gas injection tube of the oil well; and
recovering the amount of thick crude oil contained in the oil well.

11. The method of claim 10, further comprising storing liquefied carbon dioxide gas from the liquefying system in a storage tank reversibly coupled to the rectifying tower.

12. The method of claim 10, further comprising collecting nitrogen gas from the flue gases in a nitrogen separation tank coupled to the carbon dioxide absorber.

13. The method of claim 12, further comprising purifying the nitrogen gas collected in the nitrogen separation tank using adsorption solid particle packing materials in one or more drying beds.

14. The method of claim 13, further comprising mixing the nitrogen gas from the drying beds into the proportion for injecting into the gas injection tube.

* * * * *